(12) United States Patent
D'Abramo

(10) Patent No.: US 6,645,536 B2
(45) Date of Patent: Nov. 11, 2003

(54) MICRO-PARTICULATE MICROBOUND DIET FOR THE CULTURE OF LARVAL FISH AND CRUSTACEANS

(75) Inventor: Louis R. D'Abramo, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 10/108,384

(22) Filed: Mar. 29, 2002

(65) Prior Publication Data

US 2002/0192335 A1 Dec. 19, 2002

Related U.S. Application Data

(60) Provisional application No. 60/279,434, filed on Mar. 29, 2001.

(51) Int. Cl.⁷ .............................. A23K 1/18; A23L 1/05
(52) U.S. Cl. .................... 426/72; 426/285; 426/519; 426/573; 426/576; 426/641; 426/657; 426/805
(58) Field of Search .................... 426/72, 285, 573, 426/576, 519, 641, 805, 657

(56) References Cited

U.S. PATENT DOCUMENTS

| | | | |
|---|---|---|---|
| 3,922,373 A | 11/1975 | Bayless | 426/576 |
| 3,993,746 A | 11/1976 | Beigler et al. | 424/78 |
| 4,204,005 A | 5/1980 | Kudo et al. | 426/518 |
| 4,931,291 A | 6/1990 | Kojima et al. | 426/2 |
| 4,960,795 A | 10/1990 | Salte et al. | 514/560 |
| 5,047,250 A | 9/1991 | Prieels et al. | 426/2 |
| 5,171,588 A | 12/1992 | Ishihara et al. | 426/1 |
| 5,215,767 A | 6/1993 | Mitsuhashi | 426/72 |
| 5,573,792 A | 11/1996 | Dessen | 426/2 |
| 5,618,574 A | 4/1997 | Bunch | 426/641 |
| 5,834,177 A | 11/1998 | Cohen | 435/1.1 |
| 5,851,574 A | 12/1998 | Barrows | 426/285 |
| 5,945,271 A | 8/1999 | Cohen | 435/1.1 |
| 6,168,815 B1 | 1/2001 | Kossmann et al. | 426/302 |
| 6,235,528 B1 | 5/2001 | Cohen | 435/348 |
| 6,303,175 B1 * | 10/2001 | Kurzinger et al. | 426/573 |

FOREIGN PATENT DOCUMENTS

| | | |
|---|---|---|
| EP | 0292052 A2 | 11/1988 |
| EP | 0925723 A1 | 6/1999 |
| JP | 53011791 A | 2/1978 |
| WO | WO92/16115 | 10/1992 |
| WO | 95/28830 * | 11/1995 |
| WO | WO96/17526 | 6/1996 |
| WO | WO98/18345 | 5/1998 |
| WO | 99/12430 * | 3/1999 |

OTHER PUBLICATIONS

Koshio et al. , Aquaculture, vol. 81, pp. 145–154, 1989.*
Ohs, C.L., et al., "Evaluation of a Spray–Dried Artificial Diet for Larval Culture of Freshwater Prawn, *Macrobrachium rosenbergii*, and Striped Bass, *Morone saxatilis*", Acquaculture Nutrition, 4, 73–82 (1998).
Teshima, S., et al., "Recent Developments in Nutrition and Microparticulate Diets of Larval Prawns", Israeli Journal of Aquaculture—Bamidgeh, 45(4), 175–184 (1993).
Villamar, D.F., et al., "Delivery of Dietary Components to Larval Shrimp (*Penaeus vannamei*) by Means of Complex Microcapsules", Marine Biology, 115, 635–642 (1993).
Bautista, M.N., et al., "Use of Kappa–Carrageenan Microbound Diet (C–MBD) as Feed for *Penaeus mondon* Larvae", Marine Biology, 103, 169–173 (1989).
Jones, D.A., et al., "Penaeid Shrimp Hatchery Trials Using Microencapsulated Diets", Aquaculture, 64, 133–146 (1987).
Kanazawa, A., et al., "Culture of the Prawn Larvae With Micro–Particulate Diets", Bulletin of the Japanese Society of Scientific Fisheries, 48(2), 195–199 (1982).
Jones, D.A., et al., "Studies on the Nutritional Requirements of the Larval Stages of *Penaeus japonicus* Using Microencapsulated Diets", Marine Biology, 54, 261–267 (1979).
Chang, T.M.S., et al., "Semipermeable Aqueous Microcapsules", Canadian Journal of Physiology and Pharmacology, 44, 115–128 (1966).
Cohen, A.C., "New Oligidic Production Diet for *Lygus hesperus* Knight and *L. lineolaris* (Palisot de Beauvois)", J. Entomol. Sci., 35(3), 301–310 (2000).
Cohen, A.C., "A New Concept in Artificial Diets for *Chrysoperla rufilabris*: The Efficacy of Solid Diets", Biological Control, 13, 49–54 (1998).

* cited by examiner

*Primary Examiner*—Chhaya Sayala
(74) *Attorney, Agent, or Firm*—Piper Rudnick LLP; Steven B. Kelber

(57) ABSTRACT

A formulated, microbound diet product for the culture of larval fish and crustaceans either in a dry or moist form is disclosed. The food product contains protein sources such as fish protein hydrosylate, casein, egg yolk, binding agents such as soy lecithin, wheat gluten, and alginate. Other ingredients such as vitamins and minerals, lipid sources, carbohydrate sources, pigment sources, and attractant compounds are included in the diet for nutritional completeness. A method for preparation of the food product is also disclosed.

31 Claims, 4 Drawing Sheets

MICRO-PARTICULATE MICROBOUND DIET FOR THE CULTURE OF LARVAL FISH AND CRUSTACEANS

This application claims priority from U.S. Provisional Application Ser. No. 60/279,434 filed Mar. 29, 2001. The entirety of that provisional application is incorporated herein by reference.

This invention was made with U.S. Government support under Grant No. NA86RG0039 awarded by National Oceanic and Atmospheric Administration's Office of Sea Grant, U.S. Department of Commerce, in conjunction with the Mississippi-Alabama Sea Grant Consortium and Mississippi State University. The U.S. Government may have certain rights in this invention.

BACKGROUND OF THE INVENTION

1. Field of the Invention

The present invention relates to a microparticulate diet for the culture of larval fish and crustaceans. In particular, the present invention relates to a proteinaceous and nutritionally complete formulated food product to replace live feed as the diet for larval fish and crustaceans using *Macrobrachium rosenbergii* as the test organism.

2. Discussion of the Background

The availability and nutritional value of live food is considered to be a limiting factor in larviculture of many fish and crustacean species. Larvae of many species have been successfully raised using live food (e.g., *Artemia nauplii* and rotifers). However, there are several major disadvantages that are associated with the use of live food, such as variable nutrient composition, the potential for introduction of a pathogen into the culture system, and the amount of labor required for preparation of the live feed. Formulated feed is an attractive and valuable alternative to live food. For example, successful formulated diets can be used in nutritional studies and can serve as a vehicle for the delivery of hormones and therapeutic agents. Moreover, formulated diets introduce flexibility in adjustment of size.

Newly hatched *Artemia nauplii* and juveniles are commonly used as food for larval culture. However, the results of past research have led to concern about lack of consistency in the nutritional value of Artemia. For example, the nutritional quality and physical properties of Artemia vary depending upon the source and time of harvest of cysts (dormant eggs). In response to potential nutritional deficiencies, Artemia are commonly enriched with HUFA (highly unsaturated fatty acids) and other nutrients before feeding them to larval fish and crustaceans. (Clawson and Lovell, 1992). This enrichment is achieved by feeding algae, enriched yeast cells, or encapsulated, emulsified lipids to the larvae. The availability of Artemia cysts is subject to change. Because the availability and nutrient quality of Artemia is inconsistent, there is a need for a complete, formulated feed.

Numerous attempts to develop a formulated diet for larvae of different species have been made, but none have resulted in an effective replacement for live food. For example, microencapsulated, microbound, and microcoated formulated diets have been developed but with limited success. A microencapsulated diet is prepared by encapsulating a nutrient solution, colloid or suspension within a natural or synthetic polymer. A microbound diet is prepared by binding ingredients (usually powdered) together with a binder such as agar, alginate, or carrageenan. A microbound diet coated with materials like wheat gluten or cholesterol is termed a microcoated diet. (Bautista et al, 1989). The data collected suggest that practical diets containing raw, unrefined ingredients appear to be more effective than semi-purified diets. However, despite significant effort, limited success has been realized due to a presumed low capacity of larvae to digest these diets and the virtually unknown nutritional requirements of the larvae. Some of the previous attempts to make a formulated diet are illustrated below.

1. Bautista et al. (1989) developed a kappa-carrageenan microbound freeze-dried diet for larval *P. monodon*. This diet was composed primarily of squid, shrimp meals and bread flour. A 55% survival from zoea to postlarvae was achieved with this diet.

2. Villamar et al. (1993) created water-stable lipid wall microcapsules with gelled alginate-gelatin and evaluated the ability of larval *Penaeus vannamei* to digest the microcapsules by measuring accumulation of $^{14}C$. Minimum ingestion rates of the microcapsules were determined to be 48–99 $\mu$g dry weight of larva/day.

3. Jones et al. (1987) designed microencapsulated diets for several species of penaeid shrimp. However, higher survival was achieved when larvae were fed free particulates rather than microencapsulated diets (68 vs. 50%). In a later study, Kumlu and Jones (1995) reported slower growth and lower survival of *P. indicus* larvae fed microencapsulated diets unless an algal supplement was provided as part of the diet.

4. Koshio et al. (1989) reported good growth and survival of larvae of the prawn *Penaeus japonicus* when a diet consisting of egg yolk powder, casein, albumin, amino acid mix, soybean lecithin, cholesterol, vitamin mix, mineral mix, glucosamine chloride, and alpha cellulose was fed. The total protein content of this diet was 48.2%.

5. Ohs (1995) developed semi-purified spray-dried diets and evaluated their performance with larval striped bass, *Morone saxatilis,* and a freshwater prawn. Although the larvae of both species consumed the diets, growth and survival were significantly less than that of Artemia-fed larvae. Wan (1999) developed several semi-purified microparticulate diets and studied the influence of the weaning period and supplementation of live food on performance. The survival and growth of larvae of *M. saxatilis* and *M. rosenbergii* fed this microparticulate diet remained inferior to that achieved when fed *Artemia nauplii*.

More recent studies have shown that the contribution of the autolytic enzymes from consumed prey contribute minimally to digestion in the larval gut. (Garcia-Ortega et al., 1998 and Sorgeloos, 1999). Live food can be, at least theoretically, completely replaced by an appropriately prepared formulated diet. To ensure long term survival and growth of the larvae, the diet should be highly attractive, digestible, have a comparable nutrient composition to that of live food, and have adequate physical properties such as water stability and neutral buoyancy. (Bengston, 1993.)

Use of inert feed, such as fish or mollusk flesh or farm-made feeds that contain fish or mollusk flesh are almost exclusively used as supplements. (Lavens et al., 2000). Although currently used formulated feed are effective alternative nutrient sources and contribute to a reduction in operational costs, they do not address the critical need for control and consistency of nutrient composition. In addition, their contribution to the overall satisfaction of nutritional requirements cannot be discriminated.

The culture of many cultivated species, e.g., freshwater prawn (*Macrobrachium rosenbergii*) and striped bass (*Morone saxatilis*), is limited by the high cost of juveniles. For example, up to 60% of the cost of these species is associated with the cost of feed. Thus, the development of a comparatively inexpensive formulated diet capable of partially or completely replacing live food will not only decrease production costs associated with aquaculture enterprise but will also provide a foundation for further nutritional studies. Furthermore, successful formulated diets will help to make larviculture a more predictable and cost-effective by reducing potential sources of larval diseases, simplifying hatchery design, and providing a reliable supply of a nutritionally balanced food that is always available and is not subject to a change in the nutrient composition. Thus, the use of formulated diets for larval culture should contribute to the development of a sustainable aquaculture enterprise throughout the world through lower production costs and greater availability of juveniles of commercially cultured species of fish and crustaceans.

SUMMARY OF THE INVENTION

It is an object of the present invention to provide a formulated microbound diet for the culture of larval fish and crustaceans.

It is another object of the present invention to provide a nutritionally complete formulated diet.

It is a further object of the present invention to provide a cost-effective formulated diet.

It is yet another object of the present invention to provide a particulate food product for consumption by larval fish and crustaceans.

It is another object of the present invention to provide a formulated food product that is alginate-bound.

It is an advantage of the present invention that the formulated diet is less expensive than live feed such as *Artemia nauplii*.

It is another advantage of the present invention that the formulated artificial diet is water stable.

It is another advantage of the present invention that the formulated diet can be prepared in either a moist or dry form.

DESCRIPTION OF THE PREFERRED EMBODIMENTS

Figure 1:
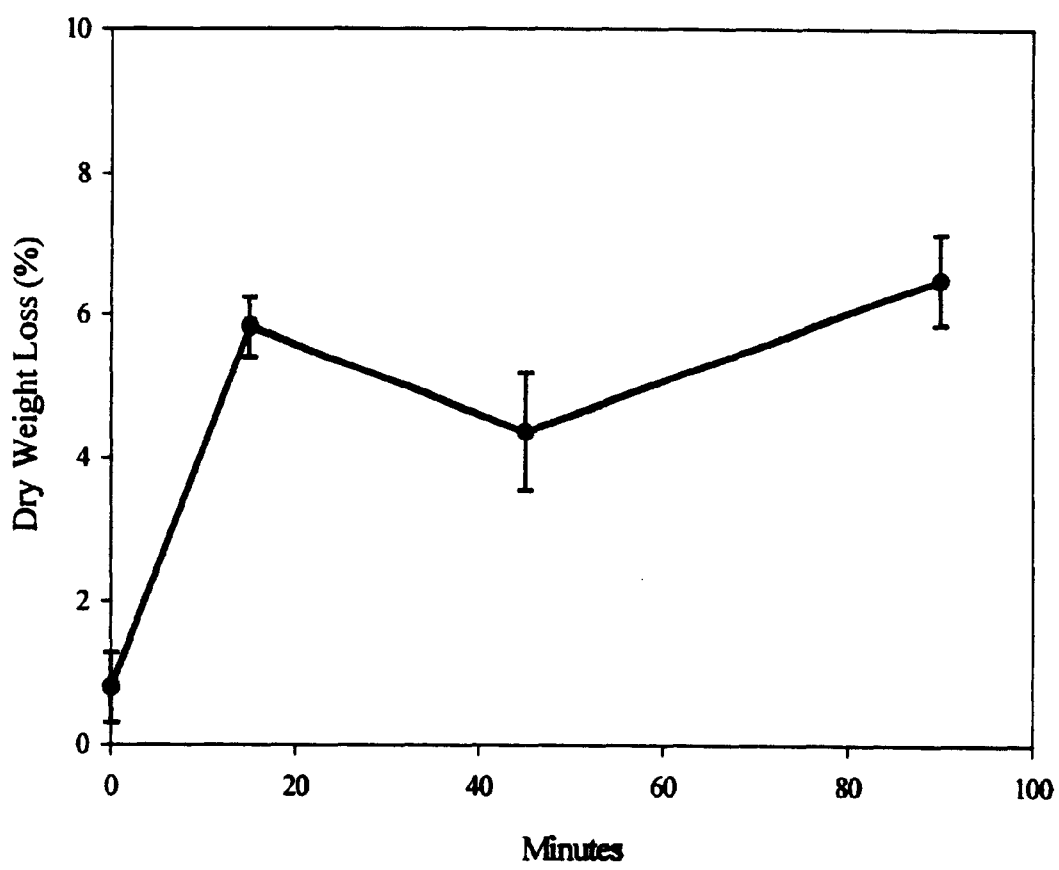
FIG. 1 is an illustration of the percent dry weight loss of the microbound diet over time.

Studies on the development of the digestive system in crustaceans provide interesting insights into the peculiarities of their physiology and assist in the development of formulated diets for commercial culture of these organisms.

For example, *Macrobrachium rosenbergii*, a tropical freshwater prawn, is widely distributed in the Indo-Pacific region of the world. Although the larvae require brackish-water conditions for development, adult prawns usually inhabit fresh water. The larvae pass through a series of 11 planktonic stages of development during a period that ranges from 20 to 50 days, principally depending upon water temperature, food, and nutrient availability. (Sandifer and Smith, 1985). The larvae are selective, raptorial carnivores, feeding primarily on zooplankton. A limited food supply and large size variation within a population can result in extensive cannibalism.

The principal components of the crustacean digestive system are the gut, including the foregut, midgut, and hindgut, and its diverticula, hepatopancreas (anterior midgut diverticulum) and posterior midgut diverticulum. (Dall and Moriarty, 1983). The fore- and hindgut evolve from ectoderm and possess chitinous linings. The midgut is endodermal in origin and lacks chitinization.

During ontogeny, crustaceans go through several different developmental stages, often accompanied by changes in their feeding behavior and strategy. Development of the digestive system corresponds to the radical changes in habitat and diet that occur at different stages of metamorphosis. (Lovett and Felder, 1989).

In most species, major ontogenetic changes in gut structure and function occur prior to or just after metamorphosis. For example, in the Peneidae, the digestive system develops into the adult form several weeks after metamorphosis from the larval state. (Id.) The gastric mill is absent in larvae, appears in early postlarvae, and becomes completely chitinized only in juveniles. The midgut of the zoea larval stage is formed of two pairs of simple caeca and midgut trunk. Later, the lateral midgut caeca develops and ramifies into the hepatopancreas (midgut gland) that is characteristic of adults. Early in the larval history, the hepatopancreas communicates freely with the foregut and the midgut. Five weeks after metamorphosis, the hepatopancreatic ducts are isolated from the remainder of the midgut by foregut ossicles.

Epithelial cells of the anterior and lateral midgut caeca of larvae are structurally and functionally similar to hepatopancreatic cells of adult shrimp. However, the lateral midgut caeca retain these features as they transform into hepatopancreatic cells, while the anterior midgut caeca degenerate into the anterior diverticulum and lose enzymatic function. In larvae, absorption occurs in all regions of the midgut, but this ability is lost after the gut has attained its adult form. At that time, the relative rate of transepithelial transport in the hepatopancreas is almost two orders of magnitude higher than that in the midgut trunk. Absorption of nutrients by the midgut trunk of larvae and early postlarvae may compensate for the small surface area of the anterior and lateral midgut caeca. There is evidence that at least some crustacean larvae are able to absorb certain nutrients from solutions and emulsions. (Rodriguez Souza et al., 1999). The midgut in Penaeus has also been reported to function in ion transport and regulation of water movement. (Lovett and Felder, 1989).

In contrast to penaeid larvae, early larval stages of *M. rosenbergii* do not possess the anterior midgut diverticula, but hepatopancreatic lobes develop rapidly from zoea stage onward. (Jones, 1998).

Both anti-peristaltic and peristaltic waves are present in the larval gut. Anti-peristalsis along with anal drinking, oral drinking, and foregut contractions maintain a positive hydraulic pressure which is needed to expand the hepatopancreas and to increase its surface area. (Lovett and Felder, 1989).

The larvae of many crustaceans feed superfluously, i.e., through continuous movement of particles through the gut. As a result, gut retention time is very short and often food is not completely digested before leaving the gut. When the food supply is interrupted, almost all of the food is retained in the gut until the next feeding. This feeding strategy can be explained by patchy distribution and unpredictable availability of food. (Id). For example, larvae of *Penaeus monodon* can completely evacuate their gut contents up to 5–7 times/h. (Kurmaly et al., 1989). Kurmaly et al. (1990) demonstrated that the gut evacuation time of lobsters increased both with starvation time and the size of the larvae. As a general tendency, motility decreases during ontogeny and the average food retention time increases. This change corresponds to the development of hepatopancreas. (Lovett and Felder, 1990a and Jones, 1998).

A peritrophic matrix (PM) is formed in a large number of Crustacea. In Decapoda, the cylindrical PM is secreted by a ring of cells behind the digestive gland openings. Besides a protective function that is also characteristic of many insects, the peritrophic membrane in crustaceans separates stored chyme, as well as feces, from extraperitrophic water. Studies of PM have focused primarily on the adult crustaceans; however, the presence of PM has been reported in larval lobster and white shrimp. (Lovett and Felder, 1990a).

In lobster, total enzymatic activity is low prior to hatching, then protease and amylase activities slightly increase at stage I and almost double by stage II. Protease reaches maximum activity at stage IV, lipase and amylase peak at stages V. These changes correspond to morphological changes in the midgut gland. (Factor, 1981 and Biesiot, 1990).

Acid phosphatase and esterase activities are present in gut tissues of *Penaeus setiferus* at all developmental stages. Protease activity is observed in the anterior and lateral midgut caeca and, in larvae and early postlarvae, in the anterior midgut. (Lovett and Felder, 1990c). For larvae of *Macrobrachium rosenbergii*, trypsin and esterase activities peak at stages V–VI and amylase activity remains low, then begins to increase at stage VI–VIII, and reaches its maximum during stages X–XI. This sequence of changes in enzyme activity indicates that early larval stages of freshwater prawn are strictly carnivorous. (Kamarudin et al., 1994).

Synthesized but not yet secreted enzymes contribute to the enzyme activity measured in tissue homogenates. (Lovett and Felder, 1990b). In contrast to the usual assumption that high enzymatic activity is a response to high levels of corresponding substrate in food, enzymes may be secreted at high levels to maximize the rate of utilization of food items containing essential nutrients. Although diet alters enzyme activity, it is not a primary effector of the ontogenetic change. Instead, the ontogenetic change appears to be principally dependent upon genetically programmed changes in enzyme synthesis and is a secondary effect of change in the function of midgut during its differentiation.

Further, microorganisms are found in the digestive tract of many crustaceans and are often there because they have been ingested by the animals. It is believed that microflora may serve as a supplementary source of enzymatic activity. However, the density and species composition of the bacteria in the gut is often different from that in the surrounding environment, indicating the presence of a relationship rather than an accidental occurrence. (Moss et al., 2000). The main gram negative aerobic bacteria species identified in the gut of juvenile penaeid shrimp were Vibrio, Aeromonas, and Pseudomonas. In fairy shrimp (*Brachinella spinosa*), a bacterial population of the genus Serratia was concentrated in the hindgut and possessed strong chitinolytic activity. (Ampe and Thiery, 1998).

Isolates of resident bacteria show a much higher activity of amylase, cellulase, chitinase, protease, and lipase than transient bacteria, suggesting that indigenous bacteria may play a significant role in digestion. (Pinn et al., 1997). Because food remains in the digestive tract of most crustacean larvae for only a short time, bacterial fermentation is not very likely to occur. However, microbial activity can possibly supply the larvae with vitamins and essential amino acids. (Dall and Moriarty, 1983). As gut retention time increases during ontogeny, the role of microbiota in digestion may also increase.

Little is known about the nutritional requirements of larval crustaceans but it is presumed that they differ from those of juveniles and adults. Teshima et al. (1982) studied sterol, phospholipid, essential fatty acids, and protein requirements of larval prawns (*Penaeus japonicus*) and created successful microbound diets containing casein as a main protein source and carrageenan as a binder. Jones et al. (1979a) demonstrated that the larvae of *P. japonicus* possess the ability to elongate 18:3n-3 to 20:5n-3 and 22:6n-3, and 18:2n-6 to 20:2n-6. However, the rates of these biosynthetic reactions were insufficient to satisfy the metabolic demands for maximum growth. It became clear that a dietary supplement that contained highly unsaturated fatty acids was needed. Carotenoids are important dietary compounds that are responsible for pigmentation in crustaceans and are directly related to their survival and growth. (Meyers and Latscha, 1997). D'Abramo et al. (1983) discussed the use of different carotenoids in diets for juvenile lobsters *Homarus americanus* and stated that the ability to utilize dietary pigment is directly related to its biochemical proximity to astaxanthin. Carotenoids derived from the consumption of Artemia by larvae are almost exclusively in the form of canthaxanthin.

Achieving the palatability of live food in formulated diets has always been an important goal. In particular, if the food is not palatable, the diet will be rejected and then death from starvation becomes inevitable. A study done by Carr (1978) demonstrated that certain substances of low molecular weight stimulated feeding behavior in *Palaemonetes pugio* as well as did the extracts from crab, oyster, and sea urchin, their natural food. Betaine significantly contributed to the stimulatory capacity of the mixture of appropriate L-forms of amino acids. In the absence of the amino acids, the effectiveness of betaine was limited. Kurmaly et al. (1990) confirmed that artificial diets were more acceptable when stimulatory compounds such as L-glutamic acid, betaine, and several other amino acids were included. The authors also stated that selectivity and preference of lobster larvae for natural diets appeared to decrease as the age of the larvae increased.

The present inventor has developed a formulated diet for larval fish and crustaceans that has achieved growth and survival that is essentially equivalent to what is achieved with live food. In particular, the combination of protein sources, binding materials, together with vitamins and minerals and other sources of essential nutrients and bound with alginate form a food product that was found to be an acceptable diet for *Macrobrachium rosenbergii*. However, this diet is not to be construed as being limited to any particular larval fish or crustacean, as one of ordinary skill in the art would recognize it to be applicable to species of larval fish and crustaceans other than *M. rosenbergii*. Preferred protein sources for use in this formulated diet include a mixture of fish protein hydrosylate, casein, and egg yolk or egg yolk powder. Suitable binding agents include a combination of soy lecithin, wheat gluten, and alginate. In preferred embodiments of the present invention, the crude protein content is at least 45% of the total weight of the composition, the thickening agent is present in an amount of at least 4% of the total composition.

Vitamins and minerals are added to the formulated food product of the present invention to ensure the nutritional value of the diet. Water soluble vitamins that may be incorporated into the food produce include thiamine mononitrate, riboflavin, niacin, D Ca pantothenate, pyridoxine HCl, Vitamin $B_{12}$, folic acid, biotin, inositol, ascorbic acid, PABA, BHA and alphacel. Suitable minerals for use in the food product include calcium carbonate, calcium phosphate dibasic, citric acid, cupric sulfate, ferric citrate, magnesium oxide, manganese citrate, potassium iodide, potassium phosphate dibasic, potassium sulfate, sodium chloride, sodium phosphate and zinc citrate. The vitamin and mineral mixtures as shown below in Tables 2 and 3 are commercially available.

Further, the food product may include ingredients such as menhaden oil, corn oil, canthaxanthin, cholesterol, betaine, choline chloride, ascorbylpalmitate, vitamin A, vitamin D, vitamin E, monobasic potassium phosphate and glucosamine. These ingredients are provided to satisfy assumed requirements of both macro and micro-nutrients. The proportional amounts and ingredients can be modified to address specie-specific nutritional requirements. Such modifications would be attainable by one of skill in the art.

A further understanding of the present invention can be obtained by reference to an example provided herein for purpose of illustration only and is not intended to be limiting unless otherwise specified.

EXAMPLE

Culture System and Conditions

Larvae used for the following experiments were held in 2.2 L plastic containers suspended within aquaria. Each aquarium served as a self-contained recirculating system with biofilter as described by Ohs et al. (1998). This type of system provided sufficient replication while adhering to a design that is characteristic of large-scale hatchery systems. The system was prepared 1–2 weeks prior to the beginning of the experiment to allow acclimation of the biofilter.

Larvae of *Macrobrachium rosenbergii* were cultured in 12 ppt brackish water at 28° C. Half of the water in the aquarium where the containers were suspended was exchanged every three days (10–15 L/day). Each culture container had two mesh screens of approximately 15 cm² each to allow for free water exchange with surrounding water. Water temperature and salinity were monitored daily. High-intensity, artificial light was provided from 0700 to 1700 h. Containers were cleaned daily to remove dead animals, uneaten diet, and exuviae.

Experimental Animals and Stocking Procedures

Larvae of *Macrobrachium rosenbergii* were obtained from ovigerous females that were maintained in 30,000 L pools at the Eastern Unit of the National Warmwater Aquaculture Center located at Mississippi State University and fed a diet of beef liver and minced squid. Several gravid females carrying eggs in an advanced stage of development (3–4 days before hatch) were selected and transported to a recirculating system where they were kept until hatching occurred. Newly hatched larvae were collected in a separate tank and later removed to stock into the containers that were part of the experimental system.

Larvae were stocked into the culture containers at a density of 50/L and generally started feeding on the second day after hatching. All larvae were initially fed *Artemia nauplii* obtained from the hatching of cysts (Sweetwater Express, Aquatic Ecosystems, Inc.). The cysts were placed in 1 L Imhoff cones containing well-aerated salt water (10–15 ppt) at 28° C. and hatching was allowed to occur over a period of approximately 18 hours. Prior to feeding, the Artemia were rinsed under tap water to separate hatched *nauplii* from unhatched cysts. When feeding of the formulated diet was initiated, the majority of the larvae were at stage V.

Composition and Preparation of the Diets

Sources of the ingredients used for preparation of the microbound formulated diet are listed in Table 1.

TABLE 1

Sources of ingredients used in experimental, microbound formulated diets.

| Ingredient | Company |
| --- | --- |
| Casein, vitamin free | United States Biochemical |
| Rice starch | Sigma Chemical Co. |
| Fish protein hydrosylate | Sopropeche (France) |
| Refined Soy lecithin | United States Biochemical |
| Wheat gluten | United States Biochemical |
| Menhaden oil | United States Biochemical |
| Canthaxanthin | Roche |
| Cholesterol | United States Biochemical |
| Vitamin premix BML#2 | ICN Biomedicals, Inc. |
| $KH_2PO_4$ | United States Biochemical |
| Choline chloride | United States Biochemical |
| Glucosamine | United States Biochemical |
| Alginate | Kelco |
| Ascorbylpalmitate | Sigma Chemical Co. |
| Mineral premix | ICN Biomedicals, Inc. |
| Vitamin A | ICN Biomedicals, Inc. |
| Vitamin $D_3$ | ICN Biomedicals, Inc. |
| Vitamin E | United States Biochemical |
| Fresh Egg yolk | Grocery Store |
| Egg yolk powder | Sigma Chemical Co. |

TABLE 2

Composition of vitamin mix BML#2*

| Component | g / kg |
| --- | --- |
| Thiamine mononitrate | 5 |
| Riboflavin | 8 |
| Niacin | 26 |
| D Ca pantothenate | 15 |
| Pyridoxine HCl | 3 |
| Vitamin $B_{12}$ | 1 |
| Folic acid | 5 |
| Biotin | 1 |
| Inositol | 180 |
| Ascorbic acid | 125 |
| PABA | 30 |
| BHA | 1 |
| Alphacel | 600 |

*Commercially available

TABLE 3

Composition of mineral premix.*

| Component | % |
| --- | --- |
| Calcium carbonate | 2.100 |
| Calcium phosphate dibasic | 73.500 |
| Citric acid | 0.227 |
| Cupric sulfate | 0.046 |
| Ferric citrate | 0.558 |
| Magnesium oxide | 2.500 |
| Manganese citrate | 0.835 |
| Potassium iodide | 0.001 |
| Potassium phosphate dibasic | 8.100 |
| Potassium sulfate | 6.800 |

TABLE 3-continued

Composition of mineral premix.*

| Component | % |
|---|---|
| Sodium chloride | 3.060 |
| Sodium phosphate | 2.140 |
| Zinc citrate | 0.133 |

*Commercially available

Alginate-Bound Diet

The ingredient composition of the alginate-bound diet is presented in Table 4. Fish hydrosylate, casein, rice starch, soy lecithin, wheat gluten, and canthaxanthin were added to a beaker containing distilled water (200 mL/100 g of diet) and solubilized. Menhaden oil, in which both cholesterol and ascorbylpalmitate were solubilized, was then added and mixed. Then, a vitamin premix, betaine (attractant), choline chloride, a mineral premix, monopotassium phosphate, and glucosamine were added and mixed. Next, yolk was separated from the albumin and the yolk membrane of a chicken egg and then mixed with the other ingredients. As an alternative embodiment, egg yolk powder may be used in place of the egg yolk.

The mixture of these ingredients was homogenized in a VirTishear homogenizer (The Virtis Company, Gardiner, N.Y.) for 3 min. at 2000 rpm until a smooth consistency was obtained. Alginate was then added, followed by additional homogenization for 2 min. at 2000 rpm. The resulting homogenate was autoclaved at 554 g/cm$^3$ for 20 min. The autoclaving procedure was designed to promote a physical binding of the dietary ingredients through the combination of temperature and pressure and to eliminate potential anti-nutritional factors that might be present in some ingredients. After autoclaving, the diet assumed a consistency of "custard" and had a moisture content of 62–65%. Crude protein, crude fat (acid hydrolysis method), ash, and moisture were determined according to standard methods. (AOAC, 1990). The diet was stored at 5° C. and used within three weeks after preparation. On the other hand, low moisture diets (5–15% moisture content) can be stored frozen with a shelf life of several months. Such a diet can be obtained by freeze or air drying the alginate-bound diet described above.

Samples of the high moisture diet (6 to 18 g) were placed into small mesh (90 μm nitex) bags, and suspended and immersed in water of 12 ppt salinity and 28° C. held in a beaker. Circulation was achieved through moderate aeration using a diffuser. There were five treatments representing 0, 1, 15, 45, and 90 min. of immersion and 3 replicates per treatment. After the different periods of immersion, samples of the diet were air-dried and the loss of dry weight was determined relative to a sample that was not immersed. Samples were then analyzed for levels of dietary riboflavin and thiamin (initial and post immersion) using a modified HPLC procedure. (Hasslemann et al., 1989).

TABLE 4

Ingredient composition (% dry weight) of the alginate-bound egg yolk diet.

| Ingredient | Range (%) | Preferred % |
|---|---|---|
| Egg yolk or egg yolk powder | 25–45 | 38.45 |
| Casein (vitamin free) | 10–30 | 14.69 |
| Fish protein hydrosylate | 10–30 | 15.38 |

TABLE 4-continued

Ingredient composition (% dry weight) of the alginate-bound egg yolk diet.

| Ingredient | Range (%) | Preferred % |
|---|---|---|
| Rice starch | 5–20 | 7.69 |
| Soy lecithin | 1–5 | 1.92 |
| Wheat gluten | 4–10 | 3.85 |
| Menhaden oil or mixture of oils and essential fatty acids | 1–7 | 5.63 |
| Canthaxanthin (10%) | 2–4 | 2.31 |
| Cholesterol | 0.1–0.5 | 0.12 |
| Ascorbylpalmitate | 0.025–0.050 | 0.04 |
| Vitamin premix BML#2 | 1–4 | 1.15 |
| Betaine | — | 0.15 |
| $KH_2PO_4$ | 1–2 | 1.15 |
| Choline chloride | 0.25–0.50 | 0.38 |
| Mineral premix | 1–2 | 1.54 |
| Glucosamine | — | 0.15 |
| Alginate | 4–7 | 5.38 |

Feeding Procedures

Prior to feeding, the alginate-bound diet was manually pushed through a sieve (pore size=380 μm). The resulting particles were then suspended in a small volume (approximately 20 ml) of culture water with a pipette, and an appropriate quantity was then added to the culture containers. The suspension formed was fed manually to the larvae using a pipette.

Larvae were fed every 1.5–2 hours. Larvae that were fed Artemia exclusively were fed according to the schedule recommended by D'Abramo et al. (1995). Depending upon estimated total biomass, larvae were fed 20–100 mg of diet (dry weight) per one culture container for each feeding or approximately 0.5 to 2.5 mg diet per larva per day. The formulated diet was provided in excess to ensure that some particles were always present in the water column.

Diet Evaluation

A proximate analysis of the alginate-bound diet was conducted by the Mississippi State Chemistry Laboratory according to the procedures of the AOAC (1990). The macronutrient composition Artemia nauplii 6 hours after hatching (Garcia-Ortega et al., 1998) and the experimental diet is presented in Table 5.

Consumption of the alginate-bound diet was confirmed by observation of the gut using light microscopy, fluorescent microscopy, videomicrography, and scanning electron microscopy. Acceptability of the diet was subjectively evaluated based upon the feeding behavior of the larvae, time of handling of a particle and, finally, rejection or consumption of the particle.

TABLE 5

Comparison of the macronutrient composition of the formulated microbound diet and Artemia nauplii.

| Content | Artemia nauplii (live food) | Formulated Diet[1] Alginate-bound w/egg yolk |
|---|---|---|
| Crude protein | 53.8 | 46.1 |
| Lipid | 16.2 | 37.4 |
| Ash | 11.1 | 5.6 |
| NFE (by difference) | 6.6 | 10.9 |

[1]Moisture content can range from 5–65%.

Statistical Design and Data Analysis

Either a completely randomized or a randomized block design was used for assignment of dietary treatments to culture containers. A minimum of six replicates per treatment was used in each experiment. The growth and survival responses to the alginate-bound diet were compared to the responses of a live reference diet (*Artemia nauplii*).

At the termination of each of the experiments, survival was calculated as the sum of larvae and postlarvae remaining at the end of the experiment divided by the initial number of larvae stocked and multiplied by 100%. A larval stage index, LSI, was calculated for the surviving population of larvae/postlarvae for each replicate of the reference and experimental diet as a mean larval stage as described by Manzi et al. (1977). Stage of larval development was identified according to the figures in Malecha (1983) using a dissecting microscope. Values of LSI range from a minimum of 1 to 12 (postlarvae).

To analyze dietary dependent survival and growth collectively, a normalized larval stage index, NLSI, was calculated based upon the normalized biomass index, NBI, used by Conklin et al. (1975).

$$NLSI=(N_1*LSI_1-N_0*LSI_0)/100$$

where $N_1$=number of larvae/postlarvae at the end of an experiment, $LSI_1$=mean larval stage index at the end of an experiment, $N_0$=number of larvae initially stocked, $LSI_0$—mean larval stage index at the beginning of an experiment.

Analysis of variance (ANOVA) using the general linear model of SAS (Statistical Analysis System, version 8. 1, Cary, NC) was used to determine if the mean survival, LSI, or NLSI was significantly different between dietary treatments. Percent values were arc sine transformed before statistical analysis. For all comparisons, P>0.05 was accepted as the significance level.

Results of Alginate-Bound Diet

Figure 2:
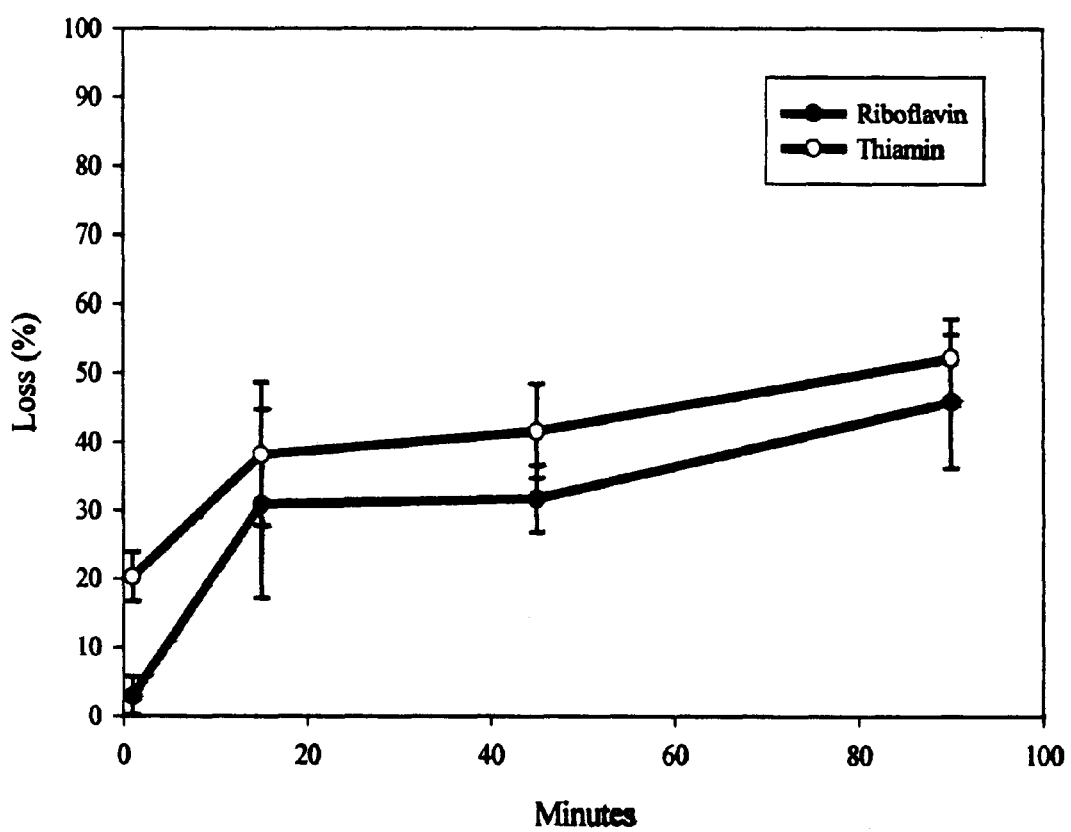
FIG. 2 is an illustration of the loss of thiamin and riboflavin due to leaching over time.

As illustrated in FIG. 1, the mean dry weight loss of the microbound diet after 90 min. of immersion was 6.50%. The greatest change in dry weight occurred between 1 and 15 min. of immersion. FIG. 2 shows that leaching of water-soluble nutrients, represented by the losses of water soluble vitamins, thiamin and riboflavin, were substantially higher, 51.8% and 45.9%, respectively after 90 min. of immersion. The greatest percent loss of these vitamins occurred within the 1 to 15 min. interval when the rate of dry weight loss was the greatest.

Figure 3:
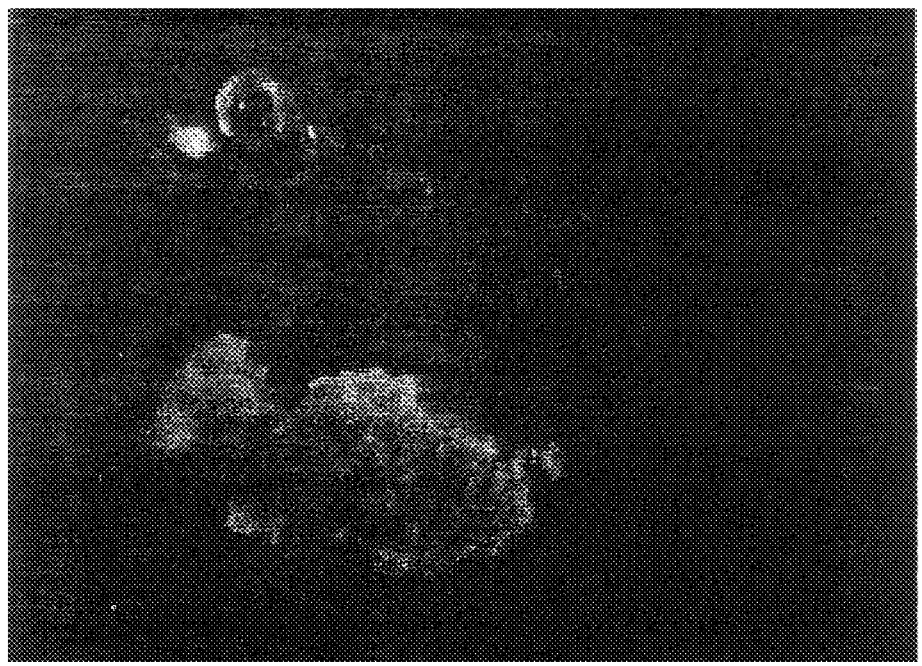
FIG. 3 is a fluorescent microscope image of larvae consuming a formulated diet according to the present invention.
Figure 3:
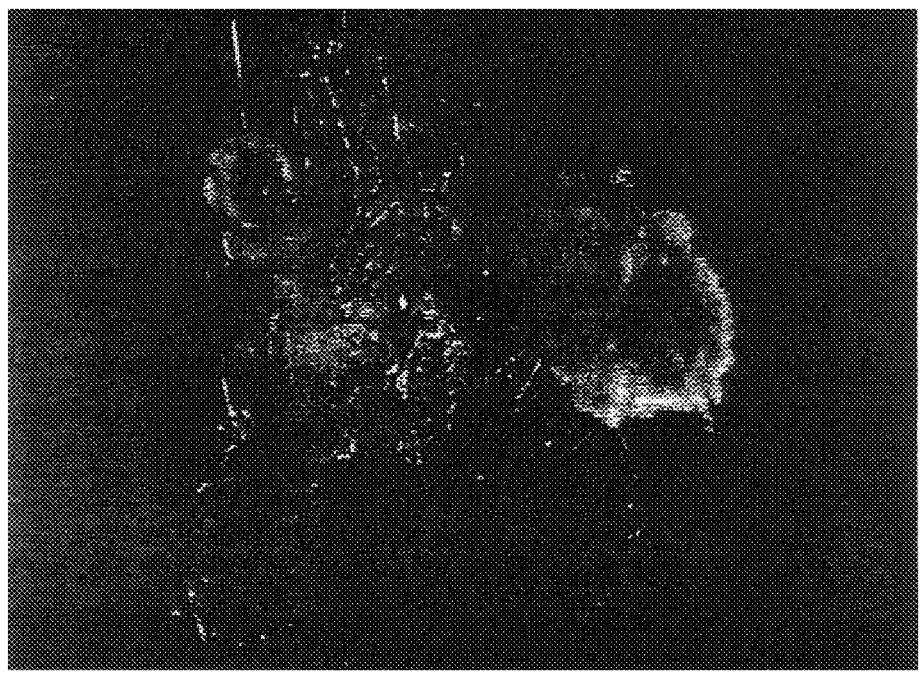
Figure 4:
FIG. 4 is a scanning election microscope image of the cross-section of the gut of *M. rosenbergii*.
Figure 4:
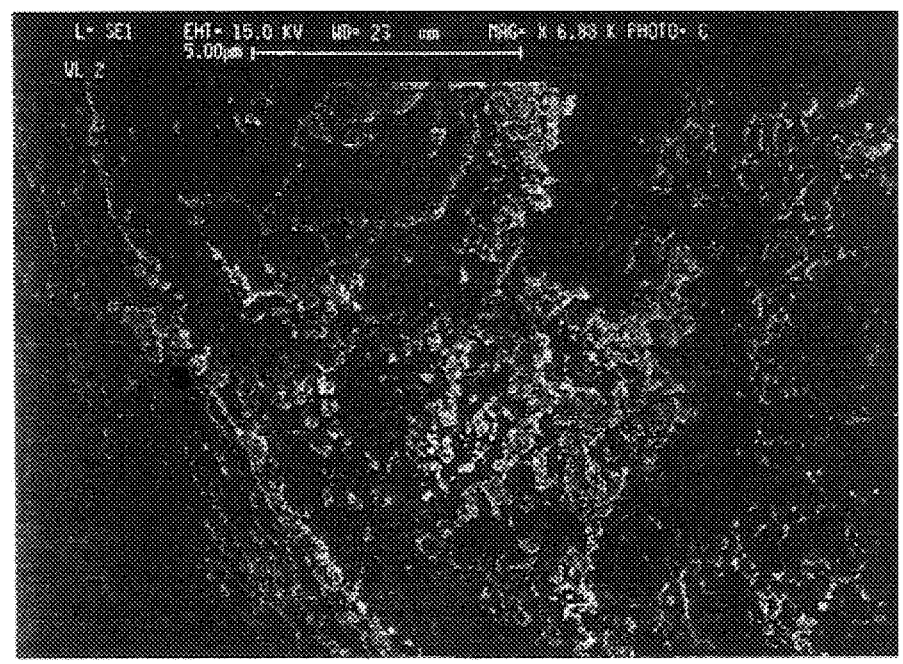

As shown in FIGS. 3 and 4, the larvae continuously consumed the microbound diet and their gastrointestinal tracts were always observed to be full. Nearly all the larvae immediately consumed the microbound diet on the first day when feeding of live *Artemia nauplii* was completely discontinued. For those larvae in containers where no feeding occurred after 10 dph, the entire population died within 3 days. The mean survival of larvae and postlarvae fed live *Artemia nauplii* did not differ significantly from that of larvae fed the microbound diet. Growth of Artemia-fed larvae, measured or mean LSI, was significantly greater. However, growth of larvae fed the microbound diet was approximately 90% of that of larvae fed live *Artemia nauplii*. The normalized larval stage index (NLSI) of larval prawns fed the microbound diet was 81% of that of larvae fed live *Artemia nauplii*. As illustrated in Table 6, with the exception of a significant difference in survival, similar results were obtained in a subsequent experiment designed to assess the consistency of growth and survival responses to the microbound diet using larvae hatched from a different group of females.

TABLE 6

Mean ± SD of survival, larval stage index (LSI), and normalized larval stage index (NLSI) of *Macrobrachium rosenbergii* larvae hatched from eggs of two different groups of females (Experiments 1 and 2) and fed live *Artemia nauplii* or the microbound diet. (N) = number of replicates.

| Experiment | Treatment | Survival (%) | LSI | NLSI |
|---|---|---|---|---|
| 1 | Artemia nauplii (9) | 86.0$^a$ ± 8.9 | 9.5$^a$ ± 0.4 | 7.2$^a$ ± 0.9 |
|   | Formulated diet (11) | 77.3$^a$ ± 16.0 | 8.5$^b$ ± 0.3 | 5.8$^b$ ± 0.9 |
| 2 | Artemia nauplii (9) | 90.3$^a$ ± 2.1 | 9.1$^a$ ± 0.4 | 7.2$^a$ ± 0.5 |
|   | Formulated diet (9) | 73.3$^b$ ± 12.8 | 8.4$^b$ ± 0.5 | 5.1$^b$ ± 1.0 |

$^{a,b}$Means with the same subscript within a column are not significantly different.

Weaning Protocol

A weaning protocol that included 4 days of feeding a mixture of *Artemia nauplii* and the microbound diet was not necessary because the larvae showed no preference when a mixture of the live and microparticulate dies was provided. The microbound diet was captured immediately upon presentation and was consumed either entirely or intermittently while being held by the feeding appendages.

Comparison of Cost of Formulated Diet to *Artemia nauplii*

The total cost of the formulated diet is approximately US $21.74/kg (on a dry weight basis). The purchase of larger quantities of feed ingredients would contribute to a reduction in cost. Comparisons of the cost of the relative amounts of Artemia cysts and microbound diet necessary to produce an equivalent amount of larvae suggest that use of the microbound diet would represent a substantial reduction in food costs for each larval cycle. Calculation of the cost of Artemia cysts was based upon a range of retail prices, the number of hatched *nauplii* produced/g of cysts, and the total number of *Artemia nauplii* fed larvae. These costs are estimates because hatching efficiencies and production costs vary through time, and production costs of live *Artemia nauplii* in a large-scale hatchery would cost less. The economic advantage of the microbound diet or similar formulated diets becomes even more dramatic because comparison to live *Artemia nauplii* as food was limited to material costs. Additional expenses required for labor, sterilization of cysts, salt for hatching of *nauplii*, supplemental feed, and possible nutrient enhancement of *Artemia nauplii* were not included. Additional savings in the cost of the microbound diet may be realized by replacement of some comparatively expensive purified ingredients of the diet with practical ingredients that do not vary appreciably in chemical composition. The estimated cyst diet was 38.45% egg yolk is shown in Table 7.

TABLE 7

Estimated cost of the alginate-bound diet with 38.45% egg yolk.

| Ingredient | Price, US $ / kg | % in diet | US $ / kg |
|---|---|---|---|
| Casein (vitamin free) | 21.34 | 19.30 | 4.12 |
| Rice starch | 40.09 | 10.00 | 4.01 |
| Fish hydrosylate | 3.30 | 20.00 | 0.66 |
| Soy lecithin | 5.51 | 2.50 | 0.14 |
| Wheat gluten | 6.06 | 5.00 | 0.30 |
| Menhaden oil | 14.47 | 7.30 | 1.06 |
| Pigment | 1887.50 | 0.23 | 4.36 |
| Cholesterol | 172.42 | 0.15 | 0.26 |
| Vitamin premix BML#2 | 79.74 | 2.00 | 1.59 |

TABLE 7-continued

Estimated cost of the alginate-bound diet with 38.45% egg yolk.

| Ingredient | Price, US $ / kg | % in diet | US $ / kg |
|---|---|---|---|
| $KH_2PO_4$ | 19.34 | 1.50 | 0.29 |
| Choline chloride | 16.39 | 0.50 | 0.08 |
| Glucosamine | 111.63 | 0.20 | 0.22 |
| Alginate | 30.84 | 7.00 | 2.16 |
| Ascorbylpalmitate | 403.74 | 0.05 | 0.20 |
| Mineral premix | 26.01 | 2.00 | 0.52 |
| Egg yolk | 8.81 | 20.00 | 1.76 |
| TOTAL | | | 21.74 |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

REFERENCES

1. Ampe, et al., "Microflora associated with the digestive tract of the fairy shrimp *Brachinella spinosa*", (H. Milne Edwards, 1840) (Crustacea, Branchiopoda). FEMS. Amsterdam, The Netherlands: Elsevier Science B. V., v. 158(2) p. 201–205 (cited from an abstract) (1998).
2. AOAC (Association of Official Analytical Chemists), "Official methods of analysis", $14^{th}$ edition, Association of Official Analytical Chemists, Inc., Washington, D.C., USA (1990).
3. Baragi, et al., "Digestive enzyme activities in striped bass from first feeding through larva development", Trans. Of the Amer. Fisheries Soc., 115, 478–484 (1986).
4. Bautista, et al., "Use of kappa-carrageenan microbound diet (C-MBD) as feed for *Penaeus japonicus* larvae", Marine Biology, 103:169–173 (1989).
5. Bengston, "A comprehensive program for the evaluation of artificial diets", Journal of the World Aquaculture Society, 24:285–293 (1993).
6. Biesiot, et al., "Changes in digestive enzyme activities during early development of the American lobster *Homarus americanus* Milne Edwards", Journal of Experimental Marine Biology and Ecology, 136:107–122 (1990).
7. Carr, "Chemoreception in the shrimp Palaemonetes pugio: the role of amino acids and betaine in elicitation of a feeding response by extracts", Comparative Biochemistry and Physiology, 61A:127–131 (1978).
8. Clawson, et al., "Improvement of nutritional value of Artemia for hybrid striped bass/white bass (*Morone saxatilis* X *M. chrysops*) larvae by n-3 HUFA enrichment of nauplii with menhaden oil", Aquaculture, 108:125–134 (1992).
9. Conklin, et al., "Initial development of artificial diets for the lobster, *Homarus americanus*", Proceedings of the sixth Annual Workshop World Mariculture Society, 6:237–248 (1975).
10. D'Abramo, et al., "Carotenoids as a source of pigmentation in juvenile lobsters fed a purified diet", Canadian Journal Fisheries and Aquatic Sciences, 40:699–704 (1983).
11. D'Abramo, et al., "Management practices for culture of freshwater prawn (*Macrobrachium rosenbergii*) in temperate climates", Mississippi Agricultural and Forestry Experiment Station, Bulletin 1030 (1995).
12. Dall, et al., "Functional aspects of nutrition and digestion. In The Biology of Crustacea.", L. H. Mantel (Ed.) Vol 5, Internal anatomy and physiological regulation, Academic Press (1983).
13. Factor, "Development and metamorphosis of the digestive system of larval lobsters, *Homarus americanus* (Decapoda: Nephropsidae)", Journal of Morphology, 169:225–242 (1981).
14. Garcia-Ortega, et al., "Biochemical and enzymatic characterization of decapsulated cysts and *nauplii* of the Brine shrimp Artemia at different developmental stages", Aquaculture, 161:501–514 (1998).
15. Hasslemann, et al., "High-performance liquid chromatographic analysis of thiamin and riboflavin in dietetic foods", J. of Micronutrient Anal., 5:269–279 (1989).
16. Infante, et al., "Partial substitution of di-and tripeptides for native proteins in sea bass diet improves *Dicentrarchus labrax* development", J. Nutr. 127:608–614 (1997).
17. Jones, "Crustacean microparticular diets", Reviews in Fisheries Science, 6(1&2):41–54 (1998).
18. Jones, et al., "Studies on the presentation of artificial diets for rearing the larvae of *Penaeus japonicus* Bate", Agriculture, 17:33–43 (1995).
19. Jones, et al., "Studies on the nutritional requirements of the larval stages of *Penaeus japonicus* using microencapsulated diets", Marine Biology, 54:261–267 (1979b).
20. Jones, et al., "Penaeid shrimp hatchery trials using microencapsulated diets", Aquaculture, 64:133–146 (1987).
21. Kamarudin, et al., "Ontogenetic changes in digestive enzyme activity during larval development of *Macrobrachium rosenbergii*", Aquaculture, 123:323–333 (1994).
22. Koshio, et al., "Nutritive evaluation of crab protein for larval *Penaeus japonicus* fed microparticulate diets", Aquaculture, 81:145–154 (1989).
23. Kumlu, et al., "The effect of live and artificial diets on growth, survival, and trypsin activity in larvae of *Penaeus indicus*", Journal of the World Aquaculture Society, 26(4):406–415 (1990).
24. Kurmaly, et al., "Acceptability and digestion of diets fed to larval stages of *Homarus gammarus* and their role of dietary conditioning behavior", Marine Biology, 106:181–190 (1990).
25. Kurmaly, et al., "Comparative analysis of the growth and survival of *Penaeus monodon* (Fabricus) larvae, from protozoea I to postlarvae I, on live feeds, artificial diets and on combination of both", Aquaculture, 81:27–45 (1989).
26. Lavens, et al., "Larval prawn feeds and the dietary importance of Artemia. In: New, M. B., Valenti, W. C. (Eds.), Freshwater Prawn Culture: The farming of *Macrobrachium rosenbergii*, Blackwell Science, Oxford, United Kingdom, pp. 91–111 (2000).
27. Lovett, et al., "Ontogeny of gut morphology in the white shrimp *Penaeus setiferus* (Decapoda, Peneidae)", Journal of Morphology, 201:253–272 (1989).
28. Lovett, et al., "Ontogeny of kinematics in the gut of the white shrimp *Penaeus setiferus* (Decapoda, Peneidae)", Journal of Crustacean Biology, 10:53–68 (1990a).
29. Lovett, et al., "Ontogenetic change in digestive enzyme activity of larval and postlarval white shrimp *Penaeus setiferus* (Crustacea, Decapoda, Peneidae)", Biological Bulletin, 178:144–159 (1990b).
30. Lovett, et al., "Ontogenetic changes in enzyme distribution and midgut function in developmental stages of

*Penaeus setiferus* (Crustacea, Decapoda, Peneidae)", Biological Bulletin, 178:160–174 (1990c).
31. Malecha, "Commercial seed production of the freshwater prawn, *Macrobrachium rosenbergii*, in Hawaii" In CRC Handbook of Mariculture, Vol. I, Crustacean Aquaculture, J. P. McVey and J. R. Moore (Eds.), CRC Press (1993).
32. Manzi, et al., "Algal supplement enhancement of *Macrobrachium rosenbergii*", Proceedings of the 8$^{th}$ Annual Meeting of the World Aquaculture Society, 8:207–233 (1977).
33. Meyers, et al. "Carotenoids", In Advances in World Aquaculture, Vol. 6, Crustacean Nutrition, L. R. D'Abramo, D. E. Conklin and D. M. Akiyama (Eds.), World Aquaculture Society, Baton Rouge, Pa., pp. 164–193 (1997).
34. Moss, et al., "Relative abundance and species composition of gram-negative, aerobic bacteria associated with the gut of juvenile white shrimp *Litopeneaus vannamei* reared in oligotrophic well water and eutrophic pond water, Journal of the World Aquaculture Society, 31:255–263 (2000).
35. Ohs, "Development and evaluation of a spray-dried artificial diet for larval culture of freshwater prawn *Macrobrachium rosenbergii*, hybrid striped bass (*Morone saxatilis* X *M. chrysops*), and striped bass (*M. Saxatilis*)., M. S. Thesis, Mississippi State Univ., Mississippi 72 p. (1995).
36. Ohs, et al., "Evaluation of a spray-dried artificial diet for larval culture of freshwater prawn *Macrobrachium rosenbergii*, and striped bass, *Morone saxatilis*", Aquaculture Nutrition, 4:73–82 (1998).
37. Pinn, et al., "Microbial flora associated with the digestive system of *Upogebia stellata* (Crustacea: Decapoda: Thalassinidea)", Journal of Marine Biology As. UK, 77(4)1083–1096 (cited from an abstract) (1997).
38. Planas, et al., "Larviculture of marine fish: problems and perspectives", Aquaculture, 177:171–190 (1999).
39. Reed et al., "A standard reference diet for crustacean nutrition research. III. Effects on weight gain and amino acid composition of whole body and tail muscle of juvenile prawns *Macrobrachium rosenbergii*", J. of the World Aquacul. Soc., 29(3):107–113 (1989).
40. Rodriguez, et al., "Absorption of dissolved and dispersed nutrients from sea water by *Panulirus japonicus* phyllosoma larvae", Aquaculture Nutrition, 5(1):41–51 (1999).
41. Ronnestad, et al., "Fish larval nutrition: a review of recent advances in the roles of amino acids", Aquaculture, 177:201–216 (1999).
42. Sakamoto, et al., "Modification of the nutritional composition of Artemia by incorporation of polyunsaturated fatty acids using microencapsulated diets", Aquaculture, 28:311–320 (1982).
43. Sandifer, et al. "Freshwater prawns", In Crustacean and Mollusk Aquaculture in United States, J. V. Huner and E. E. Brown (Eds.), AVI Publishing Co., Inc., Westport, Conn., pp. 63–125 (1985).
44. Teshima, et al., "Nutritional assessment and feed intake of microparticulate diets in crustaceans and fish", Aquaculture Research, 31:691–702 (2000).
45. Tucker, Jr., "Marine fish culture", Kluwer Academic Publishers, Boston, 750 p. (1998).
46. Villamar, et al., "Delivery of dietary components to larval shrimp (*Penaeus vannamei*) by means of complex microcapsules", Marine Biology, 115:635–642 (1993).
47. Wan, "Development and evaluation of a coagulated egg albumin microparticular diet for larval culture of freshwater prawn *Macrobrachium rosenbergii* and striped bass *Morone saxatilis*", Ph.D. thesis, Mississippi State Univ., Mississippi, 102 p. (1999).

What is claimed is:

1. A nutritionally complete, formulated, water stable food product for the culture of larval fish and crustaceans comprising:
   a source of protein, said protein comprising protein hydrosylate and separated egg yolk or egg yolk powder;
   a binding agent;
   a source of lipids;
   a vitamin premix; and
   a mineral premix.

2. The food product of claim 1, wherein said source of protein is selected from the group consisting of fish protein hydrosylate, casein, egg yolk, egg yolk powder and mixtures thereof.

3. The food product of claim 2, wherein said source of protein is present in an amount of at least 40% of the total dry weight of the product.

4. The food product of claim 1, wherein said binding agent is selected from the group consisting of alginate, rice starch, soy lecithin, wheat gluten and mixtures thereof.

5. The food product of claim 4, wherein said binding agent is present in an amount of at least 4% of the total dry weight of the food product.

6. The food product of claim 1, wherein said vitamin premix includes at least one ingredient selected from the group consisting of thiamine mononitrate, riboflavin, niacin, D Ca pantothenate, pyridoxine HCl, Vitamin B12, folic acid, biotin, inositol, ascorbic acid, PABA, BHA and alphacel.

7. The food product of claim 1, wherein said mineral premix includes at least one ingredient selected from the group consisting of calcium carbonate, calcium phosphate dibasic, citric acid, cupric sulfate, ferric citrate, magnesium oxide, manganese citrate, potassium iodide, potassium phosphate dibasic, potassium sulfate, sodium chloride, sodium phosphate and zinc citrate.

8. The food product of claim 1, wherein said lipid source is selected from the group consisting of soy lecithin, menhaden oil, canthaxanthin and cholesterol.

9. The food product of claim 1, further comprising at least one ingredient selected from the group consisting of menhaden oil, corn oil, essential fatty acid sources, canthaxanthin, cholesterol, betaine, choline chloride, ascorbylpalmitate, vitamin A, vitamin D, vitamin B, monobasic potassium phosphate and glucosamine.

10. The food product of claim 1, further comprising a pigment.

11. The food product of claim 10, wherein said pigment is canthaxanthin.

12. The food product of claim 1, wherein said food product has a moisture content of 5–15% of the total dry weight of said product.

13. The food product of claim 12, wherein said food product is a particulate product having a particle size of at least 80 μm.

14. The food product of claim 1, wherein said food product has a moisture content of 62–65% of the total dry weight of said product.

15. The food product of claim 14, wherein said food product is a particulate product having a particle size of at least 300 μm.

16. The food product of claim 1, wherein said source of protein is present in an amount of from 40–60%, said vitamin premix is present in an amount of from 1–4%, and said mineral premix is present in an amount of from 1–2%.

17. A method of preparing a nutritionally complete, formulated, water stable food product for the culture of larval fish and crustaceans comprising the steps of:
   adding a protein source, a vitamin premix, and a mineral premix to water to form an admixture, said protein source comprising protein hydrosylate and separated egg yolk or egg yolk powder;
   solubilizing said admixture;
   homogenizing said solubilized admixture; and
   adding a binding agent to said homogenized admixture to form a food product.

18. The method of claim 17, wherein said vitamin premix includes at least one ingredient selected from the group consisting of thiamine mononitrate, riboflavin, niacin, D Ca pantothenate, pyridoxine HCl, Vitamin B12, folic acid, biotin, inositol, ascorbic acid, PABA, BHA and alphacel.

19. The method of claim 17, wherein said mineral premix includes at least one ingredient selected from the group consisting of calcium carbonate, calcium phosphate dibasic, citric acid, cupric sulfate, ferric citrate, magnesium oxide, manganese citrate, potassium iodide, potassium phosphate dibasic, potassium sulfate, sodium chloride, sodium phosphate and zinc citrate.

20. The method of claim 17, further comprising the step of autoclaving said homogenized admixture after the step of adding said binding agent.

21. The method of claim 20, further comprising the step of pushing said autoclaved admixture through a sieve to form a particulate food product.

22. The method of claim 21, wherein said food product has a moisture content fo from 62–65% and has a particle size of at least 800 $\mu$m.

23. The method of claim 17, wherein said food product has a moisture content of 5–15% and a particle size of at least 300 $\mu$m.

24. The method of claim 17, further comprising the step of adding at least one ingredient selected from the group consisting of menhaden oil, corn oil, a source of essential fatty acids, canthaxanthin, cholesterol, betaine, choline chloride, ascorbylpalmitate, vitamin A, vitamin D, vitamin E, monobasic potassium phosphate and glucosamine.

25. The method of claim 17, further comprising the steps of:
   freeze-drying or air-drying said food product; and
   grinding said dried food product to form particles.

26. The method of claim 17, wherein said protein source is selected from the group consisting of fish protein hydrosylate, casein, egg yolk, egg yolk powder and mixtures thereof.

27. The method of claim 17, wherein said binding agent is selected from the group consisting of alginate, soy lecithin, wheat gluten and mixtures thereof.

28. A method of preparing a nutritionally complete, formulated, water stable food product for the culture of larval fish and crustaceans comprising the steps of:
   (a) adding fish protein hydrosylate, casein, rice starch, soy lecithin, wheat gluten and canthaxanthin to water to form a first admixture;
   (b) solubilizing said first admixture;
   (c) adding menhaden oil to said first admixture to form a second admixture;
   (d) mixing said second admixture;
   (e) adding a vitamin premix, betaine, choline chloride, a mineral premix, monobasic potassium phosphate and glucosamine to form a third admixture;
   (f) mixing said third admixture;
   (g) adding egg yolk or egg yolk powder to said third admixture to form a fourth admixture;
   (h) homogenizing said fourth admixture;
   (i) adding alginate to said homogenized admixture;
   (j) homogenizing the alginate admixture; and
   (k) autoclaving said homogenized alginate admixture to form a food product.

29. The method of claim 28, wherein said vitamin premix includes at least one ingredient selected from the group consisting of thiamine mononitrate, riboflavin, niacin, D Ca pantothenate, pyridoxine HCl, Vitamin B12, folic acid, biotin, inositol, ascorbic acid, PABA, BHA and alphacel.

30. The method of claim 28, wherein said mineral premix includes at least one ingredient selected from the group consisting of calcium carbonate, calcium phosphate dibasic, citric acid, cupric sulfate, ferric citrate, magnesium oxide, manganese citrate, potassium iodide, potassium phosphate dibasic, potassium sulfate, sodium chloride, sodium phosphate and zinc citrate.

31. A nutritionally complete, formulated, water stable food product for the culture of larval fish and crustaceans prepared by the method of claim 28.

* * * * *